US012801463B2

(12) United States Patent
Zhang et al.

(10) Patent No.: US 12,801,463 B2
(45) Date of Patent: Nov. 17, 2026

(54) SEMAPHORE SETTING DEVICE AND METHOD FOR SETTING SEMAPHORE

(71) Applicant: REALTEK SEMICONDUCTOR CORPORATION, Hsinchu (TW)

(72) Inventors: Guo-Feng Zhang, Suzhou (CN); Yun Luo, Suzhou (CN); Zhao-Ming Li, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 87 days.

(21) Appl. No.: 18/945,610

(22) Filed: Nov. 13, 2024

(65) Prior Publication Data

US 2025/0165313 A1 May 22, 2025

(30) Foreign Application Priority Data

Nov. 17, 2023 (CN) ......................... 202311545079.1

(51) Int. Cl.
*G06F 9/52* (2006.01)

(52) U.S. Cl.
CPC .................................... *G06F 9/526* (2013.01)

(58) Field of Classification Search
None
See application file for complete search history.

(56) References Cited

U.S. PATENT DOCUMENTS 6,701,429 B1 * 3/2004 Gustafsson ........... G06F 9/4405 713/400
7,743,191 B1 * 6/2010 Liao .................... G06F 13/1663 711/151
11,893,269 B2 2/2024 Ryu et al.

FOREIGN PATENT DOCUMENTS

TW 202318205 A 5/2023

OTHER PUBLICATIONS

OA letter of a counterpart TW application (appl. No. 112150860) mailed on Nov. 29, 2024.

* cited by examiner

*Primary Examiner* — Scott C Sun
(74) *Attorney, Agent, or Firm* — WPAT, PC

(57) ABSTRACT

A semaphore setting device includes a mapping circuit and a read setting circuit. The mapping circuit is configured to map at least one semaphore of a plurality of semaphores to at least one address of a plurality of addresses. The read setting circuit is coupled to the mapping circuit and configured to determine whether the at least one semaphore is occupied according to the at least one address when receiving a read request. If the read setting circuit determines that the at least one semaphore is unoccupied, the read setting circuit returns an unoccupied signal and sets the at least one semaphore to be occupied.

20 Claims, 3 Drawing Sheets

SEMAPHORE SETTING DEVICE AND METHOD FOR SETTING SEMAPHORE

BACKGROUND OF THE INVENTION

1. Field of the Invention

The present disclosure relates to a semaphore setting device and a method for setting a semaphore, especially to a semaphore setting device and a method for setting a semaphore that adopts an address mapping manner.

2. Description of Related Art

In resource operation applications, semaphores can be utilized for mutual exclusion protection among processes. However, in multi-core processor applications, if each core has multiple processes, and each process can compete for the same semaphore, users will be unable to know which process competes for and utilizes the above-mentioned semaphore.

For determining whether the semaphore is occupied, the value of the corresponding register associated with the semaphore should be read first to determine whether the above-mentioned semaphore is occupied. If the above-mentioned semaphore is unoccupied, multiple processes will compete for the above-mentioned semaphore. Additionally, to identify which process has competed for and utilized the above-mentioned semaphore, the value of the corresponding register associated with the above-mentioned semaphore should be read again. Consequently, the operation needs to read the above-mentioned semaphore repeatedly, such that the efficiency of the operation is low. In addition, the real-time performance of the operation is low, and it is hard to obtain real-time information of occupation status of the above-mentioned semaphore effectively.

SUMMARY OF THE INVENTION

In some aspects, an object of the present disclosure is to, but not limited to, provides a semaphore setting device and a method for setting a semaphore that makes an improvement to the prior art.

An embodiment of a semaphore setting device of the present disclosure includes a mapping circuit and a read setting circuit. The mapping circuit is configured to map at least one semaphore of a plurality of semaphores to at least one address of a plurality of addresses. The read setting circuit is coupled to the mapping circuit and configured to determine whether the at least one semaphore is occupied according to the at least one address when receiving a read request. If the read setting circuit determines that the at least one semaphore is unoccupied, the read setting circuit returns an unoccupied signal and sets the at least one semaphore to be occupied.

An embodiment of a method for setting a semaphore of the present disclosure includes: mapping at least one semaphore of a plurality of semaphores to at least one address of a plurality of addresses by a mapping circuit; determining whether the at least one semaphore is occupied according to the at least one address when receiving a read request by a read setting circuit; and if the read setting circuit determines that the at least one semaphore is unoccupied, returning an unoccupied signal and setting the at least one semaphore to be occupied by the read setting circuit.

Technical features of some embodiments of the present disclosure make an improvement to the prior art. Compared to the prior art, the semaphore setting device and the method for setting the semaphore of the present disclosure enhance operation efficiency of the semaphore and obtain real-time information of occupation status of the semaphore effectively.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
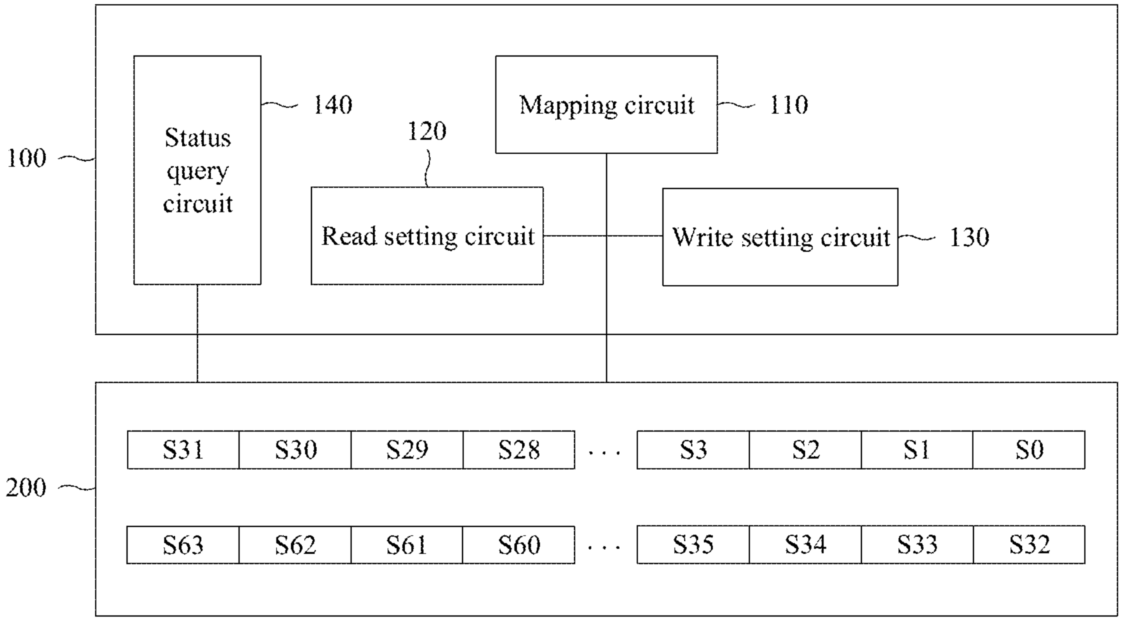
FIG. 1 shows an embodiment of a semaphore setting device and a semaphore device of the present disclosure.

FIG. 1 shows an embodiment of a semaphore setting device 100 and a semaphore device 200 of the present disclosure. As shown in the figure, the semaphore setting device 100 includes a mapping circuit 110, a read setting circuit 120, a write setting circuit 130, and a status query circuit 140. The semaphore device 200 includes a plurality of semaphores (e.g., hardware semaphores) S0~S63. In some embodiments, the mapping circuit 110 is coupled to the read setting circuit 120, the write setting circuit 130, and the semaphore device 200. In addition, the status query circuit 140 is coupled to the semaphore device 200.

The present disclosure adopts semaphores to be mutual exclusion protection among processes, such that the resource can be exclusively utilized at the same time. Furthermore, for enhancing the operation efficiency of the semaphores and obtain real-time information of occupation status of the semaphores effectively, the present disclosure adopts the mapping circuit 110 to map a plurality of semaphores to a plurality of addresses, such that the operation efficiency of the semaphores can be enhanced through reading corresponding addresses of the semaphores, which will be explained in detail as below.

Figure 2:
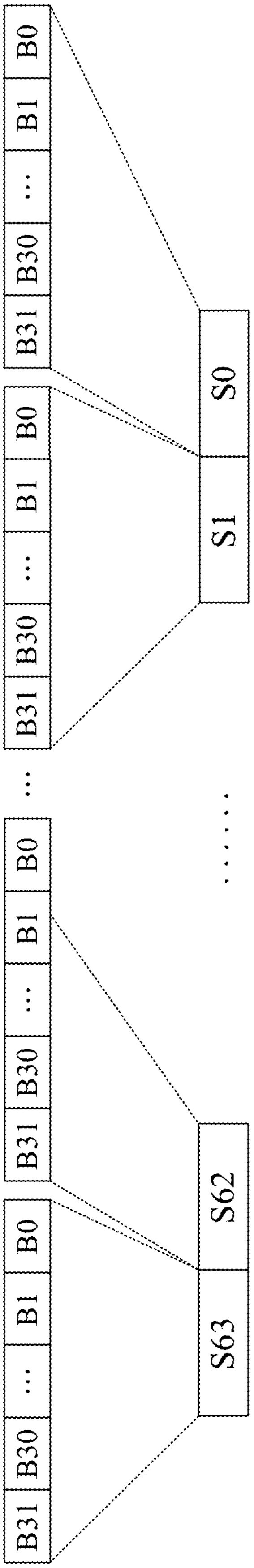
FIG. 2 shows an embodiment of a mapping manner between semaphores and addresses of the present disclosure.

For facilitating the understanding of the mapping manner between semaphores and addresses, reference is now made to both FIG. 1 and FIG. 2. FIG. 2 shows an embodiment of the mapping manner between the semaphores and the addresses of the present disclosure. As shown in FIG. 1 and FIG. 2, the mapping circuit 110 can map a plurality of semaphores S0~S63 to addresses in an address space respectively. For example, the mapping circuit 110 can map the semaphore S0 to a plurality of addresses B0~B31 in the address space, map the semaphore S1 to a plurality of addresses B0~B31 in the address space, and so on, until all semaphores S0~S63 are mapped to the corresponding addresses. In some embodiments, the address space and the plurality of addresses B0~B31 can be stored in the mapping circuit 110.

In some embodiments, the read setting circuit 120 is configured to determine whether the semaphore is occupied according to corresponding address of the semaphore when receiving a read request. If the read setting circuit 120 determines that the semaphore is unoccupied, the read setting circuit 120 returns an unoccupied signal, and sets the semaphore to be occupied. For example, the read setting circuit 120 determines whether the semaphore S0 is occupied according to the corresponding addresses B0~B31 of the semaphore S0 when receiving the read request of the semaphore S0. If the read setting circuit 120 determines that the semaphore S0 is unoccupied, the read setting circuit 120 returns the unoccupied signal (e.g., returning 0) to the sender of the read request, and the semaphore S0 can be preset to be occupied to ensure that the sender of the read request can compete for and utilize the semaphore S0.

After determining whether the semaphore of the prior art is occupied by reading the semaphore, the semaphore of the prior art should be read again to identify whether the semaphore is competed for and utilized. Compared to the prior art, the semaphore setting device 100 of the present disclosure adopts the mapping circuit 110 to map the status of the semaphore to the corresponding address, and adopts the read setting circuit 120 to read the corresponding address to obtain real-time information of occupation status of the semaphore for knowing whether the semaphore can be obtained or not. As a result, the semaphore setting device 100 of the present disclosure does not need to read the status of the semaphore repeatedly, such that the operation efficiency of the semaphore setting device 100 can be enhanced.

In some embodiments, for presetting the semaphore to be occupied to ensure that the sender of the read request can compete for and utilize the semaphore, the read setting circuit 120 can set a setting value of the corresponding address to be a high level value to set the semaphore to be occupied. For example, the read setting circuit 120 can set the setting value of the corresponding addresses B0~B31 of the semaphore S0 to be 1 to set the semaphore S0 to be occupied, such that the semaphore S0 cannot be occupied by other processes to ensure the sender of the read request can compete for and utilize the semaphore S0.

In some embodiments, the read setting circuit 120 reads a setting value of the corresponding address to determine whether the semaphore is occupied when receiving the read request. If the setting value of the address includes a low level value, the read setting circuit 120 determines that the semaphore is unoccupied, and returns an unoccupied signal. For example, the read setting circuit 120 reads the setting value of the corresponding addresses B0~B31 of the semaphore S0 to determine whether the semaphore S0 is occupied when receiving a read request of the semaphore S0. If the setting value of the corresponding addresses B0~B31 is 0, the read setting circuit 120 determines that the semaphore S0 is unoccupied, and returns an unoccupied signal (e.g., returning 0) to the sender of the read request.

In some embodiments, if the read setting circuit 120 determines that the semaphore (e.g., the semaphore S0) is occupied, the read setting circuit 120 returns an occupied signal (e.g., returning 1) to the sender of the read request.

In some embodiments, the read setting circuit 120 reads a setting value of the corresponding address to determine whether the semaphore is occupied when receiving the read request. If the setting value of the corresponding address includes a high level value, the read setting circuit 120 determines that the semaphore is occupied, and returns an occupied signal to the sender of the read request. For example, the read setting circuit 120 reads the setting value of the corresponding addresses B0~B31 of the semaphore S0 to determine whether the semaphore S0 is occupied when receiving the read request of the semaphore S0. If the setting value of the corresponding addresses B0~B31 is 1, the read setting circuit 120 determines that the semaphore S0 is occupied, and returns the occupied signal (e.g., returning 1) to the sender of the read request.

In some embodiments, the write setting circuit 130 is configured to set the semaphore to be unoccupied according to the corresponding address when receiving a write request. For example, when releasing the semaphore S0, the write setting circuit 130 sets the semaphore S0 to be unoccupied according to the corresponding addresses B0~B31 of the semaphore S0 when receiving the write request of the semaphore S0. Furthermore, when the write setting circuit 130 receives the write request of the semaphore S0, the write setting circuit 130 writes 0 to the corresponding addresses B0~B31 of the semaphore S0 to set the semaphore S0 to be unoccupied for releasing the semaphore S0.

In some embodiments, the status query circuit 140 is configured to query whether the semaphore is occupied according to a temporary storage value of the corresponding semaphore. If the status query circuit 140 determines that the semaphore is unoccupied, the status query circuit 140 returns an unoccupied signal. If the status query circuit 140 determines that the semaphore is occupied, the status query circuit 140 returns the occupied signal. For example, the status query circuit 140 can be implemented by registers. For example, the status query circuit 140 may consist of two 32-bit registers for storing 64 semaphores S0~S63 correspondingly. When querying the occupation status of the semaphores S0~S63, real-time information of the occupation status of the semaphores S0~S63 can be obtained effectively through the temporary storage value of the registers in the status query circuit 140.

It is noted that the present disclosure is not limited to the embodiments as shown in FIG. 1 and FIG. 2, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 3:
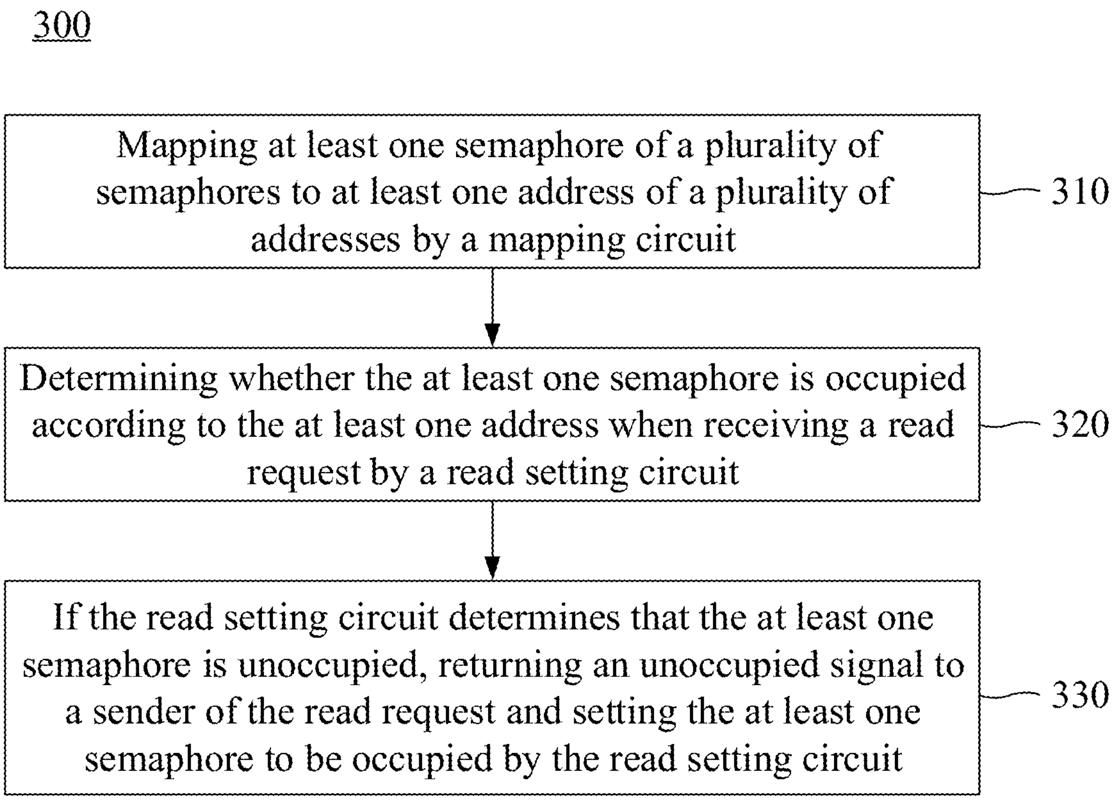
FIG. 3 shows an embodiment of a flow diagram of a method for setting a semaphore of the present disclosure.

FIG. 3 shows an embodiment of a flow diagram of a method 300 for setting a semaphore of the present disclosure. For facilitating the understanding to the method for setting the semaphore 300, reference is now made to both FIG. 1 and FIG. 3. As shown in the figure, the method 300 for setting the semaphore includes step 310~step 330, which will be explained in detail as below.

In step 310, mapping at least one semaphore of a plurality of semaphores to at least one address of a plurality of addresses by a mapping circuit 110. For example, the mapping circuit 110 can be utilized to map the semaphore S0 of a plurality of semaphores S0~S63 to a plurality of addresses B0~B31 of the address space, map the semaphore S1 of the plurality of semaphores S0~S63 to the plurality of addresses B0~B31 of the address space, and so on, until all semaphores S0~S63 are mapped to the corresponding addresses of the address space.

In step 320, determining whether the at least one semaphore is occupied according to the at least one address when receiving a read request by a read setting circuit 120. For example, when the read setting circuit 120 receives the read request of the semaphore S0, the read setting circuit 120 determines whether the semaphore S0 is occupied according to the corresponding addresses B0~B31 of the semaphore S0.

In step 330, if the read setting circuit 120 determines that the at least one semaphore is unoccupied, returning an unoccupied signal to the sender of the read request and setting the at least one semaphore to be occupied by the read setting circuit 120. For example, if the read setting circuit 120 determines that the semaphore S0 is unoccupied, the read setting circuit 120 returns the unoccupied signal (e.g., returning 0) to the sender of the read request, and presets the semaphore S0 to be occupied to ensure that the sender of the read request can compete for and utilize the semaphore S0.

In some embodiments, referring to step 320, the method 300 for setting the semaphore can further utilize the read setting circuit 120 to read the setting value of the corresponding addresses B0~B31 of the semaphore S0 to determine whether the semaphore S0 is occupied when the read setting circuit 120 receives the read request of the semaphore S0. If the setting value of the corresponding addresses B0~B31 is 0, the read setting circuit 120 determines that the semaphore S0 is unoccupied, and returns the unoccupied signal (e.g., returning 0) to the sender of the read request.

In some embodiments, referring to step 330, the method 300 for setting the semaphore can further utilize the read setting circuit 120 to set the setting value of the corresponding addresses B0~B31 of the semaphore S0 to be 1 to set the semaphore S0 to be occupied, such that the semaphore S0 cannot be occupied by other processes to ensure the sender of the read request can compete for and utilize the semaphore S0.

In some embodiments, the method 300 for setting the semaphore further includes the following step. If the read setting circuit 120 determines that the semaphore S0 is occupied, the read setting circuit 120 returns the occupied signal to the sender of the read request. For example, the read setting circuit 120 reads the setting value of the corresponding addresses B0~B31 of the semaphore S0 to determine whether the semaphore S0 is occupied when receiving the read request of the semaphore S0. If the setting value of the corresponding addresses B0~B31 is 1, the read setting circuit 120 determines that the semaphore S0 is occupied, and returns the occupied signal (e.g., returning 1) to the sender of the read request.

In some embodiments, the method 300 for setting the semaphore further includes the following step. When releasing the semaphore S0, the write setting circuit 130 sets the semaphore S0 to be unoccupied according to the corresponding addresses B0~B31 of the semaphore S0 when receiving the write request of the semaphore S0. Furthermore, when the write setting circuit 130 receives the write request of the semaphore S0, the write setting circuit 130 writes 0 to the corresponding addresses B0~B31 of the semaphore S0 to set the semaphore S0 to be unoccupied for releasing the semaphore S0.

In some embodiments, the method 300 for setting the semaphore further includes the following step. The status query circuit 140 can be utilized to query whether the semaphore is occupied according to a temporary storage value of the corresponding semaphore efficiently. If the status query circuit 140 determines that the semaphore is unoccupied, the status query circuit 140 returns the unoccupied signal (e.g., returning 0). If the status query circuit 140 determines that the semaphore is occupied, the status query circuit 140 returns the occupied signal (e.g., returning 1).

It is noted that the present disclosure is not limited to the embodiments as shown in FIG. 3, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

As described above, technical features of some embodiments of the present disclosure make an improvement to the prior art. After determining whether the semaphore of the prior art is occupied by reading the semaphore, the semaphore of the prior art should be read again to identify whether the semaphore is competed for and utilized. Compared to the prior art, the semaphore setting device 100 and the method 300 for setting the semaphore of the present disclosure adopt the mapping circuit 110 to map the status of the semaphore to the corresponding address, and adopt the read setting circuit 120 to read the corresponding address to obtain real-time information of occupation status of the semaphore for knowing whether the semaphore can be obtained or not. As a result, the semaphore setting device 100 and the method 300 for setting the semaphore of the present disclosure do not need to read the status of the semaphore repeatedly, such that the operation efficiency of the semaphore setting device 100 and the method 300 for setting the semaphore can be enhanced. When querying the occupation status of the semaphore, the semaphore setting device 100 and the method 300 for setting the semaphore of the present disclosure obtain real-time information of the occupation status of the semaphore effectively through the temporary storage value of the registers in the status query circuit 140.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A semaphore setting device, comprising:

a mapping circuit, configured to map at least one semaphore of a plurality of semaphores to at least one address of a plurality of addresses; and a read setting circuit, coupled to the mapping circuit, and configured to determine whether the at least one semaphore is occupied according to the at least one address when receiving a read request, wherein if the read setting circuit determines that the at least one semaphore is unoccupied, the read setting circuit returns an unoccupied signal, and sets the at least one semaphore to be occupied.

2. The semaphore setting device of claim 1, wherein the read setting circuit reads a setting value of the at least one address to determine whether the at least one semaphore is occupied when receiving the read request, wherein if the setting value of the at least one address comprises a low level value, the read setting circuit determines that the at least one semaphore is unoccupied, and returns the unoccupied signal.

3. The semaphore setting device of claim 2, wherein the read setting circuit sets the setting value of the at least one address to be a high level value to set the at least one semaphore to be occupied.

4. The semaphore setting device of claim 1, wherein if the read setting circuit determines that the at least one semaphore is occupied, the read setting circuit returns an occupied signal.

5. The semaphore setting device of claim 4, wherein the read setting circuit reads a setting value of the at least one address to determine whether the at least one semaphore is occupied when receiving the read request, wherein if the setting value of the at least one address comprises a high level value, the read setting circuit determines that the at least one semaphore is occupied, and returns the occupied signal.

6. The semaphore setting device of claim 1, further comprising:

a write setting circuit, coupled to the mapping circuit, and configured to set the at least one semaphore to be unoccupied according to the at least one address when receiving a write request.

7. The semaphore setting device of claim 6, wherein the write setting circuit writes a low level value to the at least one address to set the at least one semaphore to be unoccupied when receiving the write request.

8. The semaphore setting device of claim 1, further comprising:

a status query circuit, configured to query whether the at least one semaphore is occupied according to at least one temporary storage value corresponding to the at least one semaphore, wherein if the status query circuit determines that the at least one semaphore is unoccupied, the status query circuit returns the unoccupied signal.

9. The semaphore setting device of claim 8, wherein if the status query circuit determines that the at least one semaphore is occupied, the status query circuit returns an occupied signal.

10. The semaphore setting device of claim 1, wherein the mapping circuit is further configured to map each of the plurality of semaphores to a corresponding address of the plurality of addresses respectively, wherein the read setting circuit is further configured to determine whether a corresponding semaphore of the plurality of semaphore is occupied according to the corresponding address when receiving the read request, wherein if the read setting circuit determines that the corresponding semaphore is unoccupied, the read setting circuit returns the unoccupied signal, and sets the corresponding semaphore to be occupied, wherein if the read setting circuit determines that the corresponding semaphore is occupied, the read setting circuit returns an occupied signal.

11. A semaphore setting method, comprising:

mapping at least one semaphore of a plurality of semaphores to at least one address of a plurality of addresses by a mapping circuit;

determining whether the at least one semaphore is occupied according to the at least one address when receiving a read request by a read setting circuit; and if the read setting circuit determines that the at least one semaphore is unoccupied, returning an unoccupied signal and setting the at least one semaphore to be occupied by the read setting circuit.

12. The semaphore setting method of claim 11, wherein determining whether the at least one semaphore is occupied according to the at least one address when receiving the read request by the read setting circuit comprises:

reading a setting value of the at least one address to determine whether the at least one semaphore is occupied when receiving the read request by the read setting circuit; and if the setting value of the at least one address comprises a low level value, determining that the at least one semaphore is unoccupied by the read setting circuit.

13. The semaphore setting method of claim 12, wherein setting the at least one semaphore to be occupied comprises:

setting the setting value of the at least one address to be a high level value to set the at least one semaphore to be occupied by the read setting circuit.

14. The semaphore setting method of claim 11, further comprising:

if the read setting circuit determines that the at least one semaphore is occupied, returning an occupied signal by the read setting circuit.

15. The semaphore setting method of claim 14, wherein determining whether the at least one semaphore is occupied according to the at least one address when receiving the read request by the read setting circuit comprises:

reading a setting value of the at least one address to determine whether the at least one semaphore is occupied when receiving the read request by the read setting circuit; and if the setting value of the at least one address comprises a high level value, determining that the at least one semaphore is occupied and returning the occupied signal by the read setting circuit.

16. The semaphore setting method of claim 11, further comprising:

setting the at least one semaphore to be unoccupied according to the at least one address when receiving a write request by a write setting circuit.

17. The semaphore setting method of claim 16, wherein setting the at least one semaphore to be unoccupied according to the at least one address when receiving the write request by the write setting circuit comprises:

writing a low level value to the at least one address to set the at least one semaphore to be unoccupied when receiving the write request by the write setting circuit.

18. The semaphore setting method of claim 11, further comprising:

querying whether the at least one semaphore is occupied according to at least one temporary storage value corresponding to the at least one semaphore by a status query circuit; and if the status query circuit determines that the at least one semaphore is unoccupied, returning the unoccupied signal by the status query circuit.

19. The semaphore setting method of claim 18, further comprising:

if the status query circuit determines that the at least one semaphore is occupied, returning an occupied signal by the status query circuit.

20. The semaphore setting method of claim 11, wherein mapping the at least one semaphore of the plurality of semaphores to the at least one address of the plurality of addresses by the mapping circuit comprises:

mapping each of the plurality of semaphores to a corresponding address of the plurality of addresses respectively by the mapping circuit;

determining whether the at least one semaphore is occupied according to the at least one address when receiving the read request by the read setting circuit comprises:

determining whether a corresponding semaphore of the plurality of semaphores is occupied according to the corresponding address when receiving the read request by the read setting circuit;

if the read setting circuit determines that the at least one semaphore is unoccupied, returning the unoccupied signal and setting the at least one semaphore to be occupied by the read setting circuit comprises:

if the read setting circuit determines that the corresponding semaphore is unoccupied, returning the unoccupied signal and setting the corresponding semaphore to be occupied by the read setting circuit.

* * * * *